Aug. 25, 1931.  A. DINA  1,820,054
LIGHT GUARD FOR MOTION PICTURE PROJECTION MACHINES
Filed March 30, 1929  3 Sheets-Sheet 1

Inventor
Augusto Dina
By his Attorney

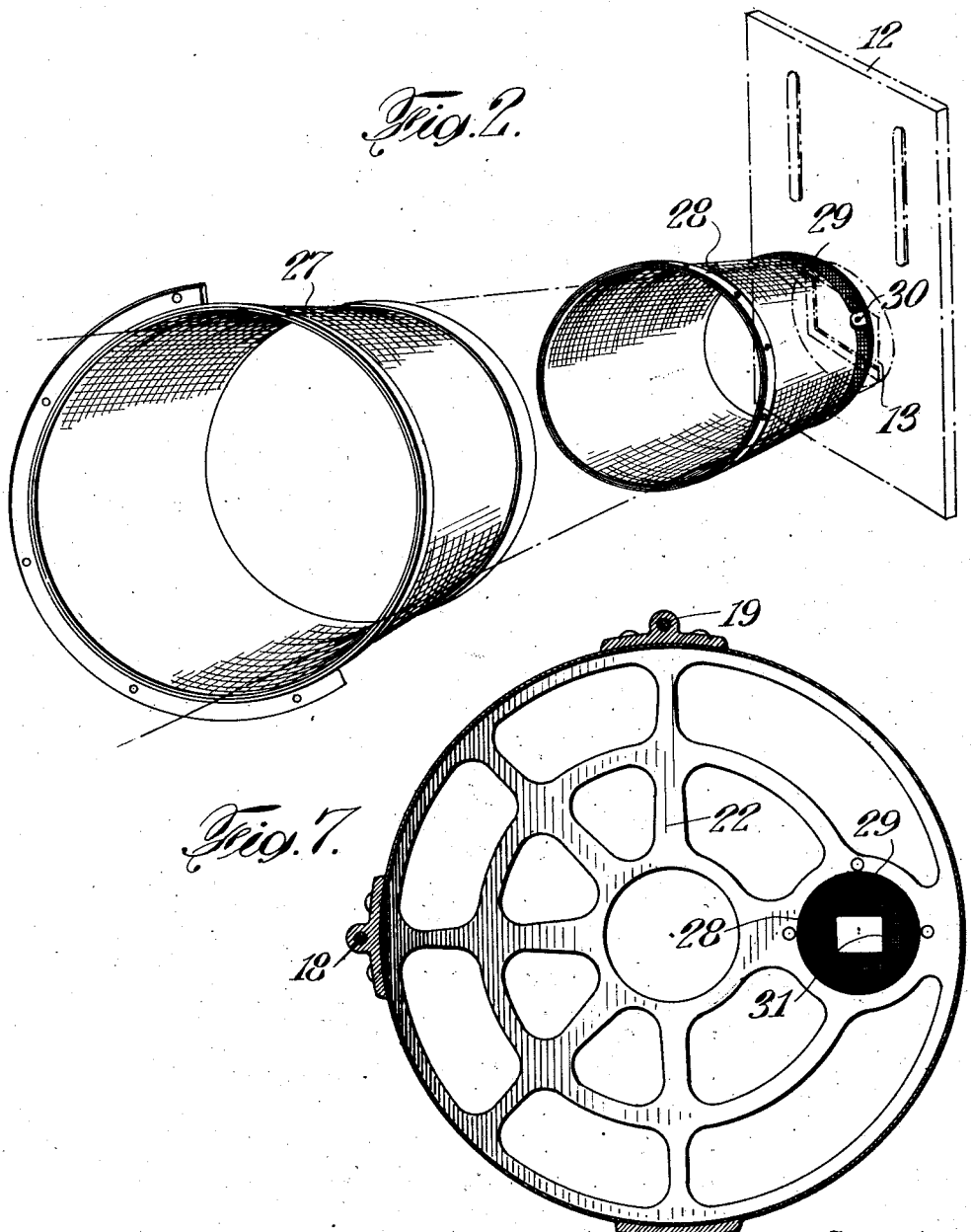

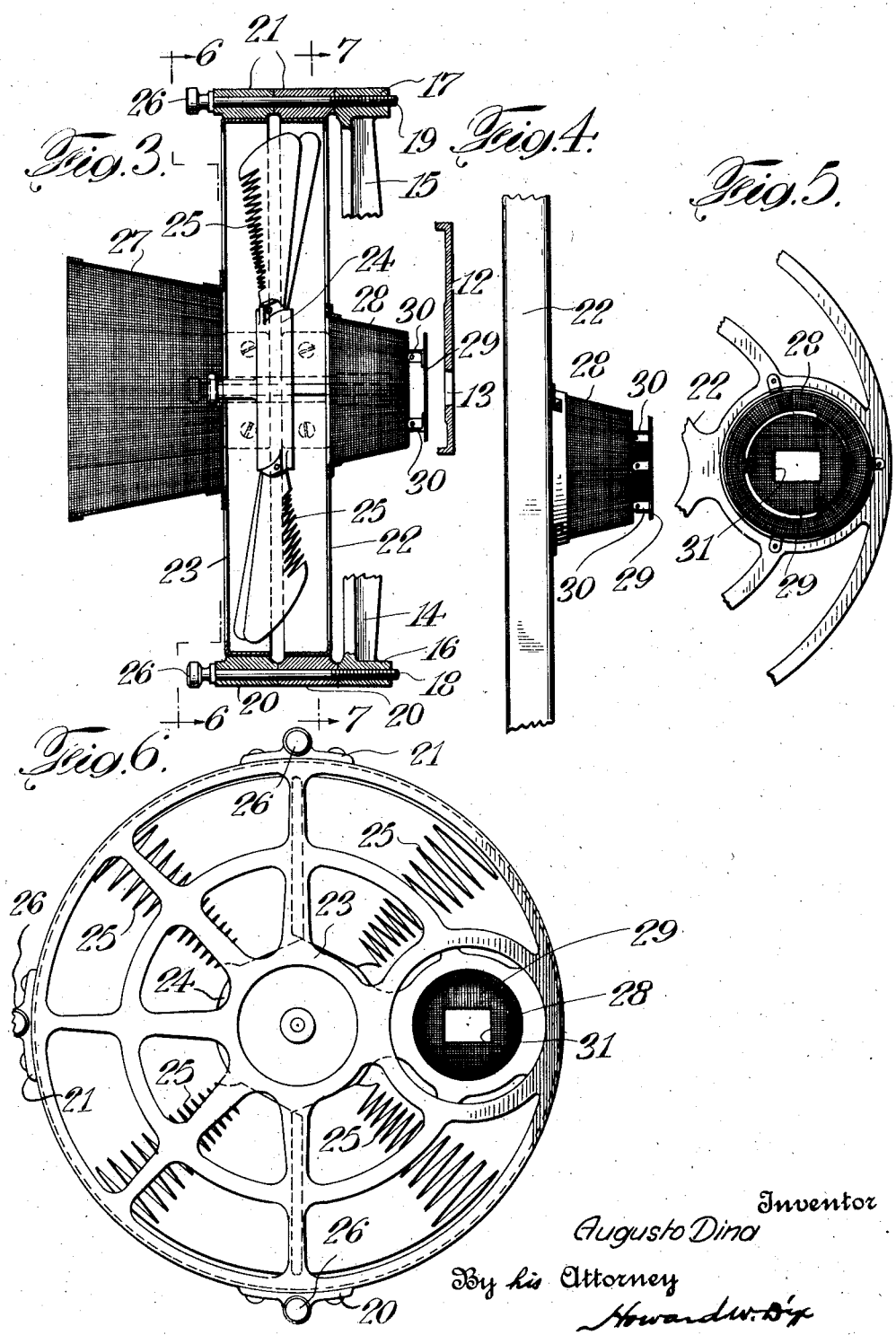

Patented Aug. 25, 1931

1,820,054

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

LIGHT GUARD FOR MOTION PICTURE PROJECTION MACHINES

Application filed March 30, 1929. Serial No. 351,206.

This invention relates to projection machines and has particular reference to improved moving picture projection machines wherein the operator may at all times inspect various parts of the mechanism exposed to the powerful projection light beam without danger to his eyes.

One of the objects of the invention is to provide a simple, compact, and efficient shielding device which is easily applied to the projector to protect the operator's eyes and which will not, however, interfere with the proper and efficient ventilation of the projection head and of the film. Thus, the novel device protects the operator's eyes, is non-breakable, permits proper cooling of the film, and of the head of the machine, and does not permit the building up of the ventilating air to an extent sufficient to blow the film out of its predetermined position when pasing the aperture opening.

Further and more specific objects features, and advantages will more clearly appear from the detailed description given below taken in connection with the accompanying drawings which form part of the specification, and which illustrate one embodiment of the invention.

Heretofore operators have used shields disposed between their eyes and the beam of projection light so that they could see the film aperture opening and properly adjust the projection light thereon. These shields have been made of glass or similar imperforate material and especially material which would break or crack and have to be constantly replaced. Moreover, such material would considerably interfere with the distribution of the air currents set up by the fan action of the shutter when the shutter is mounted at the rear of the head and constructed and arranged to act as a ventilator as well as an ordinary shutter.

This invention, however, provides a shield of perforated material such, for instance, as wire mesh screening, which at least partly surrounds the beam of projection light and preferably is so disposed all the way from the lamp house to the projection head that the operator's eyes are fully protected all along this path of the beam from the back reflection from the aperture and from the shutter blades. The shield is also constructed and arranged to permit free and proper ventilation of the head and the film and to control the amount of light falling on the aperture opening and to effectively dispose of the unusable light in the beam. The parts constituting the shield device and its related parts are simply constructed and assembled and can be very readily applied to and removed from the machine if desired. Altho I use the word perforated to describe the shields or guards I intend also to thereby include the use of material which is foraminous and not strictly perforated in the strict sense of the word.

In the drawings, which illustrate the present preferred form of the invention,

Fig. 2 is a perspective view of the two shield elements,

Fig. 3 is a vertical longitudinal section through the shields and the shutter guard casing, Fig. 4 is a partial side elevation of the shutter guard casing and one of the shield elements, Fig. 5 is a rear elevational view of Fig. 4.

Fig. 6 is a section taken on the line 6—6 of Fig. 3, and

Fig. 7 is a similar section taken on the line 7—7 of Fig. 3.

Figure 1:
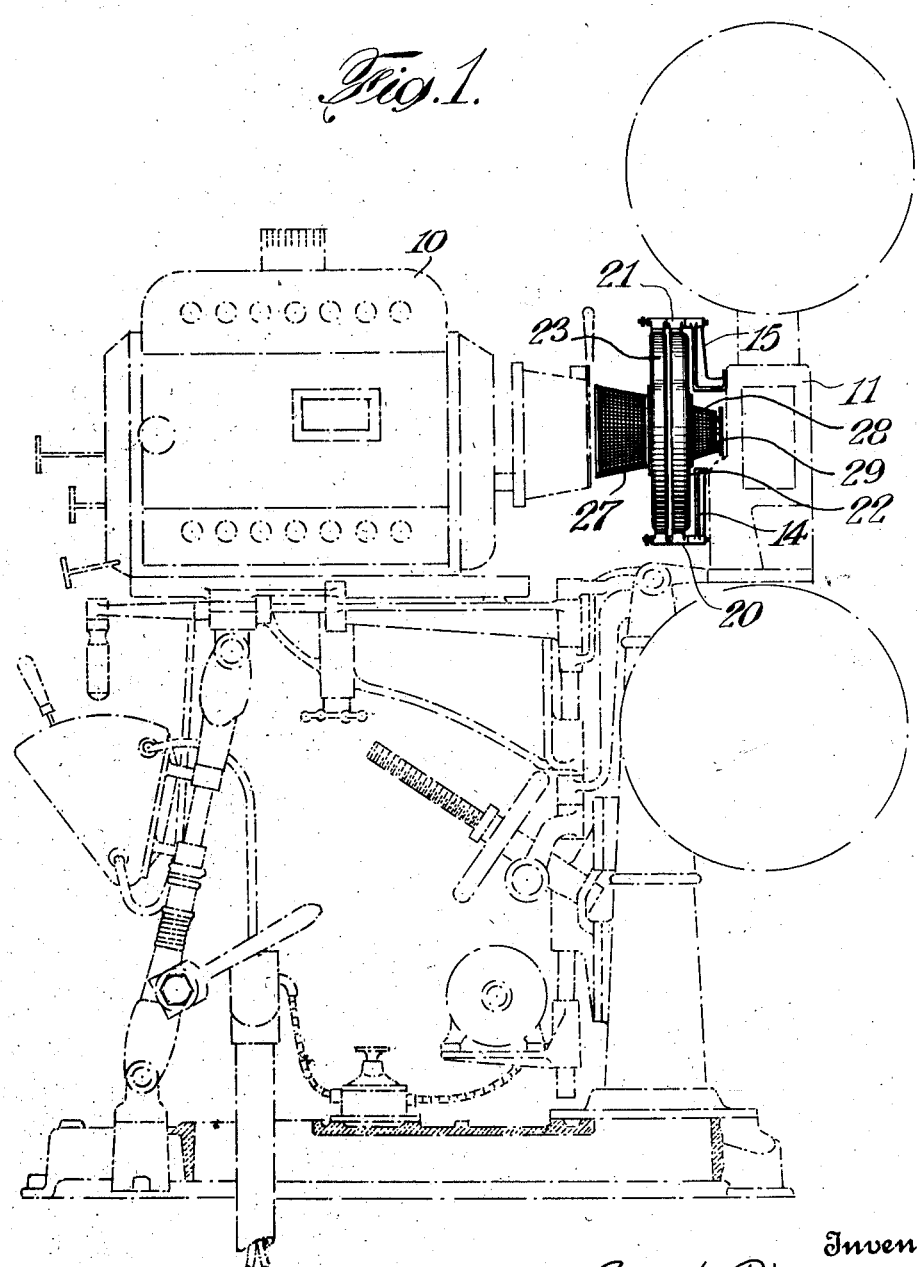
Fig. 1 is a side elevation of the invention as applied to a projection machine.

The present preferred form of the invention, as shown in the drawings, comprises the application of the invention to a motion picture projector having a lamp house 10 and a projection head 11. This head 11 has the usual film plate 12 in which is disposed the aperture opening 13. To the head 11 is attached a spider-like frame having arms such as 14 and 15 with bored sleeves 16 and 17 (Fig. 3), to receive the threaded ends of bolts 18 and 19. The outer ends of these bolts 18 and 19 slidably receive similar bored sleeves such as 20 and 21 on open-work guard plates 22 and 23 which lie adjacent each other and act as a housing for a shutter 24. This shutter 24 is provided preferably with four blades having leading edges 25 combed to reduce flickering. Preferably these blades are twisted at an angle to their plane of rotation to thereby throw the air toward the aperture opening 13 in the plate 12. To remove the guard plates, it is merely necessary to remove the nuts 26 on the outer ends of the bolts 17 and 18 and then the plates may be readily slid off the bolts.

To the side of the guard plate 23 back of the shutter 24, and in line with the axis of the projection light beam, is supported a conical shaped shield element 27 made of suitable perforated material such as wire mesh material or perforated metal sheeting or the like. To the other guard plate 22 and fastened thereto in line with the same optical axis is a similarly conical shaped perforated shield element 28 made preferably of wire mesh material but smaller in size than the other one because the light beam at this point is smaller in diameter than it is where the other shield element is located. These shield elements 27 and 28 are shown as surrounding the beam of light but it is to be understood that they may only partly extend around the beam, their purpose being to lie principally between the beam and the eyes of the operator. They may be flat in shape rather than round and conical in form. Also, these shield elements may be supported in proper positions by any suitable supporting means. The preferred manner is herein shown as being attached to the plates 22 and 23. At the end of the shield element 28 lying adjacent the aperture opening 13, there is preferably fastened an end wall 29 made of mesh fabric or other suitable material and spaced from the element 28 and held thereto by means of bracket members 30. This end wall is provided with an opening 31 which is designed to be of a proper size to permit a predetermined cross sectional area of light to pass therethrough directly on the aperture opening 13 and to prevent light in area in excess thereof from passing to the head and unnecessarily heating it up. Thus the opening 31 is a definer of the area of light which is allowed to fall on the aperture opening. The spacing between the end wall 29 and the shield element 28 is provided to allow unobstructed passage to the air currents set up by the fan shutter 24.

It will be noted that there is provided a fan-shutter behind the projection head 11 properly guarded and housed and creating air currents directed upward the head of the machine and particularly toward the aperture opening 13 to keep the film and the head cool. All along the light beam between the lamp house 10 and the head 11 there is disposed the perforate shield elements 27 and 28 and lying between the beam and the eyes of the operator. Preferably the shield surrounds the beam so that the operator may look at the beam from any position without danger. The shield being perforate will not materially obstruct the free flow of air and is made of material which will not crack or break. The material and in fact the whole construction is of relatively light and open-work material which will to a minimum extent conduct heat and will radiate it to a maximum extent.

While there has been described an improvement in detail and with respect to a preferred form thereof, it is not desired that it be limited to such details or form since many changes and modifications may be made and the invention embodied in other forms without departing from the spirit and scope of the invention in its broader aspects. Hence it is desired to cover all modifications and forms coming within the language or scope of any one or more of the appended claims.

What is claimed, is:

1. In a projection machine having a projection light beam, a projection head having an aperture opening upon which said beam is directed, a perforated shield around a portion of the beam adjacent said head, and an end wall to said shield, said wall extending across said beam and having an opening therein of predetermined cross-sectional area to define the area of the light beam falling upon the aperture opening.

2. In a projection machine having a projection light beam, a projection head having an aperture opening upon which said beam is directed, a perforated shield around a portion of the beam adjacent said head, and an end wall to said shield, said wall extending across said beam and having an opening therein of predetermined cross-sectional area to define the area of the light falling upon the aperture opening, said end wall being spaced from the main portion of the shield.

3. In a projection machine having a projection light beam, a projection head having an aperture opening upon which said beam is directed, a shutter adapted to move across said beam between the head and the source of the light, a perforated shield disposed around the beam between the shutter and the head, and a second perforated shield disposed around the beam between the shutter and the source of the light.

4. In a projection machine having a projection light beam, a projection head having an aperture opening upon which said beam is directed, a shutter adapted to move across said beam between the head and the source of the light, a perforated shield disposed between the beam and the operator's position, a portion of said shield being disposed between the head and the shutter and another portion of said shield being disposed between the shutter and the source of the light.

5. In a projection machine having a projection light beam, a projection head having an aperture opening upon which said beam is directed, a shutter adapted to move across said beam before it impinges upon said opening, said shutter constructed to throw air toward the opening, a guard for said shutter, and a perforated shield supported from said guard and disposed between it and the head and adjacent said beam.

6. In a projection machine having a tapering projection light beam, a shutter adapted to move across said beam, a projection head on one side of the shutter and having an aperture opening therein, and a lamp house on the other side of the shutter, said shutter constructed to throw air toward the aperture opening, and a perforated shield of conical shape disposed between the shutter and the head and constructed to at least partly surround the beam.

7. In a projection machine having a tapering projection light beam, a shutter to move across said beam, a projection head on one side of the shutter and having an aperture opening therein, and a lamp house on the other side of the shutter, said shutter constructed to throw air toward the aperture opening, a perforated shield of conical shape disposed between the shutter and the head and constructed to at least partly surround the beam, and a second perforated shield of conical shape disposed between the shutter and the lamp house and adapted to at least partly surround the beam, said shields protecting the eyes of the operator in viewing the shutter and the aperture opening and permitting the air to pass therethrough.

8. In a projection machine having a tapering projection light beam, a shutter adapted to move across said beam, a projection head on one side of the shutter and having an aperture opening therein, and a lamp house on the other side of the shutter, said shutter constructed to throw air toward the aperture opening, a guard for said shutter, a perforated shield of conical shape supported from said guard and disposed between the shutter and the head, and adapted to at least partly surround the beam, and a second perforated shield of conical shape supported from said guard and disposed between the shutter and the lamp house and adapted to at least partly surround the beam, said shields protecting the eyes of the operator in viewing the shutter and the aperture opening and permitting the air to pass therethrough.

9. In a projection machine having a tapering light beam, a projection head having an aperture opening upon which said beam is directed, a perforated shield surrounding a portion of the beam before the light impinges upon said opening, an end wall supported by said shield and disposed across the path of part of the light, said end wall having an opening therein to define the cross sectional area of the beam which is allowed to fall upon the aperture opening directly.

10. In a projection machine having a tapering light beam, a projection head having an aperture opening upon which said beam is directed, a frame fastened to said head, a pair of guard plates of open-work material detachably supported from said frame, a shutter housed within said guard plates, and adapted to move across said beam, said shutter being constructed to throw air toward said aperture opening, a conical shaped shield of perforated material supported from one of said plates and at least partly surrounding the beam between the shutter and the head, a second conical shaped shield of perforated material supported from the other of said plates and at least partly surrounding the beam between the shutter and the source of the projection light beam.

11. In a projection machine having a tapering light beam, a projection head having an aperture opening upon which said beam is directed, a frame fastened to said head, a pair of guard plates of open-work material detachably supported from said frame, a shutter housed within said guard plates and adapted to move across said beam, said shutter being constructed to throw air toward said aperture opening, a conical shaped shield of perforated material supported from one of said plates and at least partly surrounding the beam between the shutter and the head, a second conical shaped shield of perforated material supported from the other of said plates and at least partly surrounding the beam between the shutter and the source of the projection light beam, an end wall of perforated material on the first of said shields and disposed across the path of part of the light, said end wall having an opening therein to define the cross-sectional area of the beam which is allowed to fall upon the aperture opening directly.

12. In a projection machine having a tapering light beam, a projection head having an aperture opening upon which said beam is directed, a frame fastened to said head, a pair of guard plates of open-work material detachably supported from said frame, a shutter housed within said guard plates and adapted to move across said beam and constructed to throw air toward said aperture opening, a conical shaped shield of perforated material supported from one of said plates and at least partly surrounding the beam between the shutter and the head, a second conical shaped shield of perforated material supported from the other of said plates and at least partly surrounding the beam between the shutter and the source of the projection light beam, an end wall of perforated material on the first of said shields and disposed across the path of part of the light, said end wall having an opening therein to define the cross-sectional area of the beam which is allowed to fall upon the aperture opening directly, said end wall being spaced from the main portion of the adjacent shield to form a lateral opening.

AUGUSTO DINA.